United States Patent
Mekenkamp

(10) Patent No.: US 10,972,446 B2
(45) Date of Patent: Apr. 6, 2021

(54) DEVICE PAIRING

(71) Applicant: SIGNIFY HOLDING B.V., Eindhoven (NL)

(72) Inventor: Gerhardus Engbertus Mekenkamp, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/484,350

(22) PCT Filed: Feb. 5, 2018

(86) PCT No.: PCT/EP2018/052785
§ 371 (c)(1),
(2) Date: Aug. 7, 2019

(87) PCT Pub. No.: WO2018/146042
PCT Pub. Date: Aug. 16, 2018

(65) Prior Publication Data
US 2020/0036569 A1  Jan. 30, 2020

(30) Foreign Application Priority Data
Feb. 10, 2017 (EP) .................................... 17155571

(51) Int. Cl.
*H04L 29/06* (2006.01)
*H04W 76/10* (2018.01)
(Continued)

(52) U.S. Cl.
CPC ...... *H04L 63/061* (2013.01); *H04L 29/06006* (2013.01); *H04L 29/08* (2013.01);
(Continued)

(58) Field of Classification Search
CPC . H04L 63/061; H04L 29/06006; H04L 29/08; H04W 76/10; H04W 12/0401;
(Continued)

(56) References Cited

U.S. PATENT DOCUMENTS

2011/0217950 A1  9/2011  Kozlay
2014/0273845 A1  9/2014  Russell et al.
(Continued)

OTHER PUBLICATIONS

Cynthia Kuo, et al., "Low-Cost Manufacturing, Usability, and Security: An Analysis of Bluetooth Simple Pairing and Wi-Fe Protected Setup", S. Dietrich and R. Dhamija (Eds.): FC 2007 and USEC 2007, LNCS 4886, pp. 325-340, 2007, Springer-Verlag, Berlin Heidelberg, Gemany.

*Primary Examiner* — Duc C Ho

(57) ABSTRACT

A method for establishing a wireless communication connection for exchanging of control messages between a first device and a second device using both of a non-standardized locking mechanism and a standardized pairing protocol, the method comprising: applying the non-standardized locking mechanism to set whether access to the standardized pairing protocol is locked or unlocked; and on condition of being activated by said non-standardized locking mechanism, performing a pairing between the first device and the second device using the standardized pairing protocol, wherein completion of the standardized pairing protocol activates the wireless communication connection for exchanging of control messages.

13 Claims, 4 Drawing Sheets

(51) Int. Cl.
*H04W 12/00* (2021.01)
*H04L 29/08* (2006.01)
*H04W 12/06* (2021.01)
*H04W 12/04* (2021.01)

(52) U.S. Cl.
CPC ..... *H04W 12/003* (2019.01); *H04W 12/0401* (2019.01); *H04W 12/04071* (2019.01); *H04W 12/06* (2013.01); *H04W 76/10* (2018.02)

(58) Field of Classification Search
CPC ......... H04W 12/04071; H04W 12/003; H04W 12/06
See application file for complete search history.

(56) References Cited

U.S. PATENT DOCUMENTS

| | | |
|---|---|---|
| 2014/0295761 A1* | 10/2014 | Lo ................... H04W 12/003 455/41.2 |
| 2015/0095493 A1 | 4/2015 | Xu et al. |
| 2015/0222517 A1 | 8/2015 | McLaughlin et al. |
| 2015/0372754 A1 | 12/2015 | Choi et al. |
| 2016/0066184 A1 | 3/2016 | Bhargav-Spantzel et al. |
| 2016/0128114 A1 | 5/2016 | Moy et al. |
| 2016/0255666 A1 | 9/2016 | Bell et al. |
| 2016/0286340 A1* | 9/2016 | Zhu ................... H04W 48/16 |
| 2017/0201886 A1* | 7/2017 | Yang ................... H04W 12/003 |
| 2017/0202034 A1* | 7/2017 | Paxinos ................ H04W 12/06 |

* cited by examiner

DEVICE PAIRING

CROSS-REFERENCE TO PRIOR APPLICATIONS

This application is the U.S. National Phase application under 35 U.S.C. § 371 of International Application No. PCT/EP2018/052785, filed on Feb. 5, 2018, which claims the benefit of European Patent Application No. 17155571.7, filed on Feb. 10, 2017. These applications are hereby incorporated by reference herein.

TECHNICAL FIELD

The present disclosure relates to pairing a controlling device with a device to be controlled.

BACKGROUND

Connected lighting refers to a system of one or more luminaires which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

In the Internet of Things (IoT) many kinds of devices are connected to the Internet. When devices are linked to a wireless network one of the most crucial steps is the initial setup. The problem is how to configure a device to join a certain network in a secure way. Usually these devices do not have a display or a keyboard to enter some kind of network identifier or security key. The initial setup in which the device is authenticated, joins the right network, and exchanges encryption keys is usually called pairing. In connected lighting the initial setup is usually referred to as commissioning, which includes pairing and configuring the device. In Bluetooth Low Energy, joining the network and exchanging keys is referred to as pairing, and when during the pairing process the encryption keys are stored for future use this is called bonding.

Wireless standards for IoT devices describe standardized ways of pairing. ZigBee, for example, includes pairing by means of a passcode and proximity based pairing. Bluetooth low energy supports a similar form of PassKey pairing, but also supports a pairing method known as "JustWorks" in which case no authentication is required. This can be used for example, to allow a phone to easily connect to a brand new device when it is powered on for the very first time. The Bluetooth Low Energy (BLE) standard also describes an out-of-band mechanism. In this case the encryption keys are shared using a method other than Bluetooth. An example is the use of NFC to exchange keys as part of the Bluetooth pairing.

D1 (US 2015/222517 A1) discloses a uniform protocol that can facilitate secure, authenticated communication between a controller device and an accessory device that is controlled by the controller. An accessory and a controller can establish a pairing, where ale accessory can provide an accessory definition record that defines the accessory as a collection of services, each service having one or more characteristics. Within a secure communication session, the controller can interrogate the characteristics to determine accessory state and/or modify the characteristics to instruct the accessory to change its state.

SUMMARY

The problem with standardized methods is that for many types of products none of the standardized solutions are perfect. For example, while entering a 4 or 6 digit passkey is not difficult, the issue is usually to find it. In case of Philips Hue-Lamps it is printed on the lamp (using a small font size). But what if the lamp is already mounted in the luminaire on the ceiling? It would be understandable that the user may find it difficult to retrieve the passkey in this situation. In Bluetooth the out-of-band mechanism could be used to exchange the encryption keys in a (non-standardized) way. However, this method is not supported by current iOS and Android devices, making it useless for applications in which a device is controlled using a smart phone. Therefore, many vendors resort to defining a (non-standardized) application level security mechanism whereby the standardized pairing and encryption is not used. This is implemented as follows; standards allow for simple connections in which messages that are sent are not protected. The data sent by an application is just sent across the network. However, the sending application encrypts the data, the wireless network passes it as ordinary data that doesn't need protection, and the appropriate receiver decrypts the data. The drawback of this approach is that a (non-standardized) pairing and encryption mechanism needs to be designed and implemented both at the sender and receiver side, while the standard mechanism (which is already implemented and available for use) remains unused.

To address such problems or similar, the present disclosure provides a method whereby an initial proprietary (or: non-standardized) locking mechanism is performed before a later standardized (or: non-proprietary) pairing method is used.

According to a first aspect disclosed herein, there is provided a method for establishing a wireless communication connection for exchanging of control messages between a first device and a second device using both of a (non-standardized) locking mechanism and a (standardized) pairing protocol, the method comprising: applying the non-standardized locking mechanism to set whether access to the standardized pairing protocol is locked or unlocked; and on condition of being activated by said non-standardized locking mechanism, performing a pairing between the first device and the second device using the standardized pairing protocol, wherein completion of the standardized pairing protocol activates the wireless communication connection for exchanging of control messages.

In embodiments, the method further comprises responsive to activation by the (non-standardized) locking mechanism, the first device obtaining authentication for the (standardized) pairing, and the completion of the (standardized) pairing being conditional on said authentication.

In embodiments, the method further comprises the (non-standardized) locking mechanism being performed between a third device having already paired with the second device, and said (standardized) pairing protocol being activated between the first device and the second device on condition of the (non-standardized) locking mechanism being performed by the third device.

In embodiments, the method further comprises the (non-standardized) locking mechanism requiring an unobstructed line of sight between the first device and second device.

In embodiments, the method further comprises the (non-standardized) locking mechanism requiring the first and second devices to be within a pre-determined physical proximity.

In embodiments, the method further comprises in response to activation by the (non-standardized) locking mechanism, the second device switching from a mode which requires the first device to use a first (standardized) pairing protocol to a mode which requires the first device to use a second (standardized) pairing protocol.

In embodiments, the method further comprises the second (standardized) pairing protocol requiring a user to manually enter a code of the second device into a user interface of the first device, whereas the first (standardized) pairing protocol does not.

In embodiments, the method further comprises said switching of mode being triggered by the second device switching from a state in which the second device reports that it does not have a display to a mode in which the second device reports that it does have a display.

In embodiments, the method further comprises said (non-standardized) locking mechanism comprising a timer mechanism configured to trigger said switching of mode in response to the elapsing of a pre-determined window of time.

In embodiments, the method further comprises the first (standardized) pairing protocol being Bluetooth JustWorks pairing, In embodiments, the method further comprises the second (standardized) pairing protocol being Bluetooth PassKey pairing.

In embodiments, the method further comprises the (non-standardized) locking mechanism being determining if a new user account belongs to a known user by comparing account registration information.

In embodiments, the method further comprises the (non-standardized) locking mechanism being completed using a shared secret between the first device and a server, and the second device and said server.

According to a second aspect disclosed herein, there is provided a device to be controlled, being operable to establish a wireless communication connection with another, controlling device for exchanging of control messages using both of a (non-standardized) locking mechanism and a (standardized) pairing protocol, the controlled device comprising: a control logic for applying the (non-standardized) locking mechanism to set whether access to the (standardized) pairing protocol is locked or unlocked; and a transmitter and receiver configured to: perform a pairing between the controlled device and the controlling device using the (standardized) pairing protocol, on condition of being activated by said (non-standardized) locking mechanism, wherein completion of the (standardized) pairing protocol activates the wireless communication connection for receiving of control messages.

According to a third aspect disclosed herein, there is provided a computer program product comprising code embodied on computer-readable storage and configured so as when run on one or more processing units of a controlled device to establish a wireless communication connection with another, controlling device for exchanging of control messages using both of a (non-standardized) locking mechanism and a (standardized) pairing protocol, the computer program product being configured to perform operations of: applying the (non-standardized) locking mechanism to set whether access to the (standardized) pairing protocol is locked or unlocked; and performing a pairing between the controlled device and the controlling device using the (standardized) pairing protocol, on condition of being activated by said (non-standardized) locking mechanism, wherein completion of the (standardized) pairing protocol activates the wireless communication connection for receiving of control messages.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
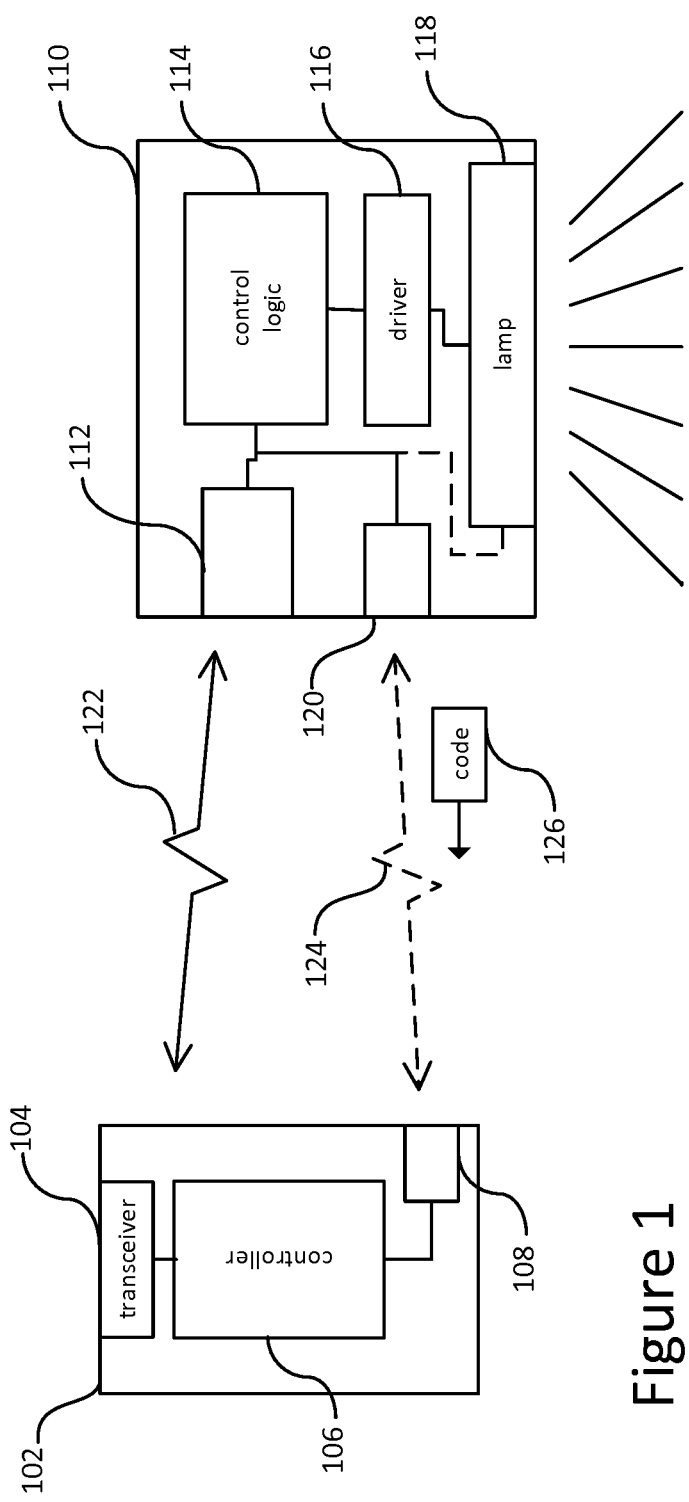
FIG. 1 is a schematic block diagram of a system comprising a controlling device and a device to be controlled by the controlling device.

To solve the problem discussed above or similar, there is herein disclosed a method in which a (non-standardized) locking mechanism unlocks or locks (and possibly provides information for), a subsequent standardized pairing method. Where the (non-standardized) locking mechanism and standardized pairing protocol are chained. Thus it is possible to achieve a trade-off between the desirable qualities of each such that a beneficial effect is achieved.

The present method concerns at least two devices. The first device intends to connect to the second device, or a device which can assist in joining a wireless network. The second device intends to join a wireless connection or wireless network. Both devices may be capable of implementing a plurality of pairing methods and communicating using a plurality of protocols. Thus there is provided a mechanism to allow or block access to the standardized paring protocol depending on the outcome of the (non-standardized) locking mechanism. The (non-standardized) locking mechanism is a non-standardized mechanism. That is to say it does not form part of the standardized pairing protocol to which access is unlocked or locked on condition of the (non-standardized) locking mechanism being activated. Throughout this description the non-standardized mechanism is also referred to as the (non-standardized) locking mechanism.

It is possible that devices may have both ZigBee and BLE capabilities. This will enable the production of lamps which do not require a bridge, since most mobile phones support BLE and thus would be able to control the lamps directly. The effect of this would be to change the pairing process as: a) the lamps of the current starter kit are paired in the factory, yet the mobile phone will need to connect to them directly; b) as now additional lamps might need to be added later, but there will be a different process required for direct connection; and c) the user might change their phone. At the moment the phone would just pair to the old bridge, which would still in turn be paired to the existing lamps, however with direct connection to the phone, and existing lamps will be required to pair again to the new phone directly.

Some examples of Bluetooth Low Energy BLE standardized pairing processes are 'JustWorks' and 'PassKey' pairing.

In 'JustWorks' a mobile phone and lamp setup pairing without any authentication. An application on a mobile phone initiates the pairing and an encryption key is exchanged for future communication with the BLE device (the lamp). JustWorks alone is not considered very safe as it does not require any authentication at any time. Allowing any device to pair via JustWorks enabled devices at any time.

In PassKey pairing a BLE device is related to a 6 digit pin code (e.g. it can be shown on-screen), which for a lamp can be printed on the lamp (and optionally the box). The user needs to enter the same pin code on the mobile phone. If the codes match, the phone and the device exchange encryption keys, and these keys are flagged as authenticated keys. When keys have been exchanged devices are said to be paired.

PassKey is fine to use alone as it does require authentication (i.e. the key) and thus is suitably secure for connecting a mobile phone to a controllable device. However, there can be some annoying processes to traverse when using PassKey from the user's point of view. For example the need to physically locate the pass key itself. Which could potentially prove difficult, e.g. the ceiling mounted light example given above. This is a likely scenario if the user follows the steps of the instructions provided, which are often presented in the order of "install lightbulb", then "enter code".

Other pairing protocols have pairing methods with similar level security to that of JustWorks. For example ZigBee which includes a proximity based pairing.

Pairing is the process required to mutually register the information on devices to be connected wirelessly. It is necessary to pair devices to establish a wireless connection. Since the pairing information is usually retained even if the devices are turned off, it is not usually necessary to pair the same devices again. Paired devices are devices which have exchanged encryption keys to enable further communication across the established connection.

Thus a (non-standardized) locking mechanism that could be used in conjunction with standardized pairing protocols such as BLE JustWorks, would allow for the standardized pairing to be used, but with the added requirement of successfully traversing the (non-standardized) locking mechanism first. The combined method is not more secure than e.g. PassKey alone, but provides a trade-off between two standardized pairing methods where each alone are seen as undesirable. Thus a pairing process is provided which allows for a trade-off between security and ease of use.

FIG. 1 is a schematic diagram comprising the first and second devices and their components.

The first device 102 comprises a transceiver 104 for transmitting and receiving wireless signals. The transceiver 104 is connected to a controller 106. The controller 106 causes the execution of the steps of both the (non-standardized) locking mechanism and the standardized pairing protocol. The standardized pairing protocol and (non-standardized) locking mechanism are facilitated by either the transceiver 104 or a further alternative interface 108, as required. The alternative interface may be any interface capable of receiving and/or transmitting information as part of one of the (non-standardized) locking mechanism. For example this may be a sensor for receiving and detecting coded light, a Near Field Communication, NFC, transmitter/receiver, or any other interface for out-of-band type exchanges of information for which a transceiver type component may not be appropriate.

The second device 110 comprises a transceiver 112 for transmitting and receiving wireless signals. The transceiver 112 is connected to the control logic 114. The control logic 114 executes the steps of the standardized pairing protocol required for pairing the device 110 to other devices e.g. device 102. This may involve executing the processes of a plurality of different protocols, and involving different elements of the device 110 which may comprise software and/or hardware. For example the logic 114 is connected to a driver 116. The logic 114 may send commands to the driver 116 such that it drives the lamp 118. The lamp 118 is housed within device 110, and the device 110 may for example be a luminaire. The logic 114 also controls a further alternative interface 120. The alternative interface 120 may be any interface capable of receiving and/or transmitting information as part of one of the (non-standardized) locking mechanism being used by the device 110. For example this may be a sensor for sensing coded light, a Near Field Communication, NFC, transmitter/receiver, or any other interface for out-of-band type exchanges of information for which a transceiver type component may not be appropriate. In the case where information is transmitted as coded light, the lamp 118 can be used in place of the further alternative interface for transmitting, and may be connected to the control logic 114 in this way.

Wireless signal 122 is any one of a plurality of possible wireless communication signal types such as Bluetooth, Wi-Fi, ZigBee, etc. it provides a pairing protocol communication stream and provides the standardized pairing and encryption communication. Side channel transmission or alternate out-of-band transmission 124 comprises a message transmitted via either a standardized pairing protocol or a special unlocking message. This transmission may comprise a code or key 126, to be used as part of the (non-standardized) locking mechanism for authenticating either of the devices 102 or 110 to other respective devices.

In some embodiments the code 126 may be received directly at the device through a device-bound method. For example for a standardized pairing protocol that requires the user of the device 102 to enter a code manually, or receive a code using a barcode scanner via 108. Thus the code made not be received by transmission 124. However it is still received by the device as part of a (non-standardized) locking mechanism that unlocks the standardized pairing protocol. That is to say that the (non-standardized) locking mechanism allows for the executing of the standardized pairing protocol.

Figure 2:
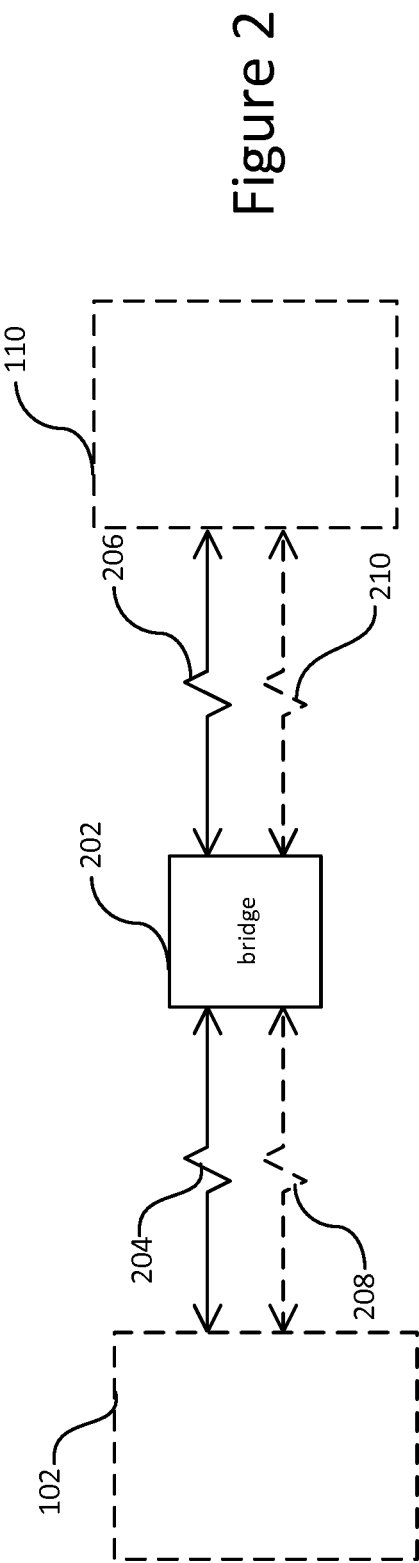
FIG. 2 is a schematic block diagram of another system comprising a controlling device and device to be controlled.

FIG. 2 illustrates the schematic of FIG. 1 where the user has expanded their system to include a bridge device 202. In this example any of transmissions 204 to 206 and 208 to 210 may be converted from one type to another by traversing the intermediate bridge device 202. For example a Wi-Fi signal sent from device 102 to the bridge device may have the content of the Wi-Fi signal relayed in the form of a ZigBee protocol communication to the device 110. Such a transformation of signal may occur in the transmission in the opposite direction in a similar way. The bridge device may be particularly relied upon to instigate the device 110 to again report that it does not have a display. That is at a later time than a factory new period in which this state is reported. The factory new period being a pre-defined window of time (i.e. the first 10 minutes of use), and the later time being after this window has elapsed. Therefore enabling, at some later time, the standardized pairing being used to be one that does not require a code, e.g. JustWorks pairing.

Pairing begins with a request message to pair, and is followed by an exchange of messages between the device wishing to be controlled and the device through which the control commands are to be entered. Again an example being a mobile phone and lamp. The exchange of messages can become quite complex and include many back and forth exchanges of information and negotiations, eventually including (if successful) an exchange of encryption keys. In standardized methods the pairing method is blocked by default, and then is unblocked through the exchange of messages.

Figure 3:
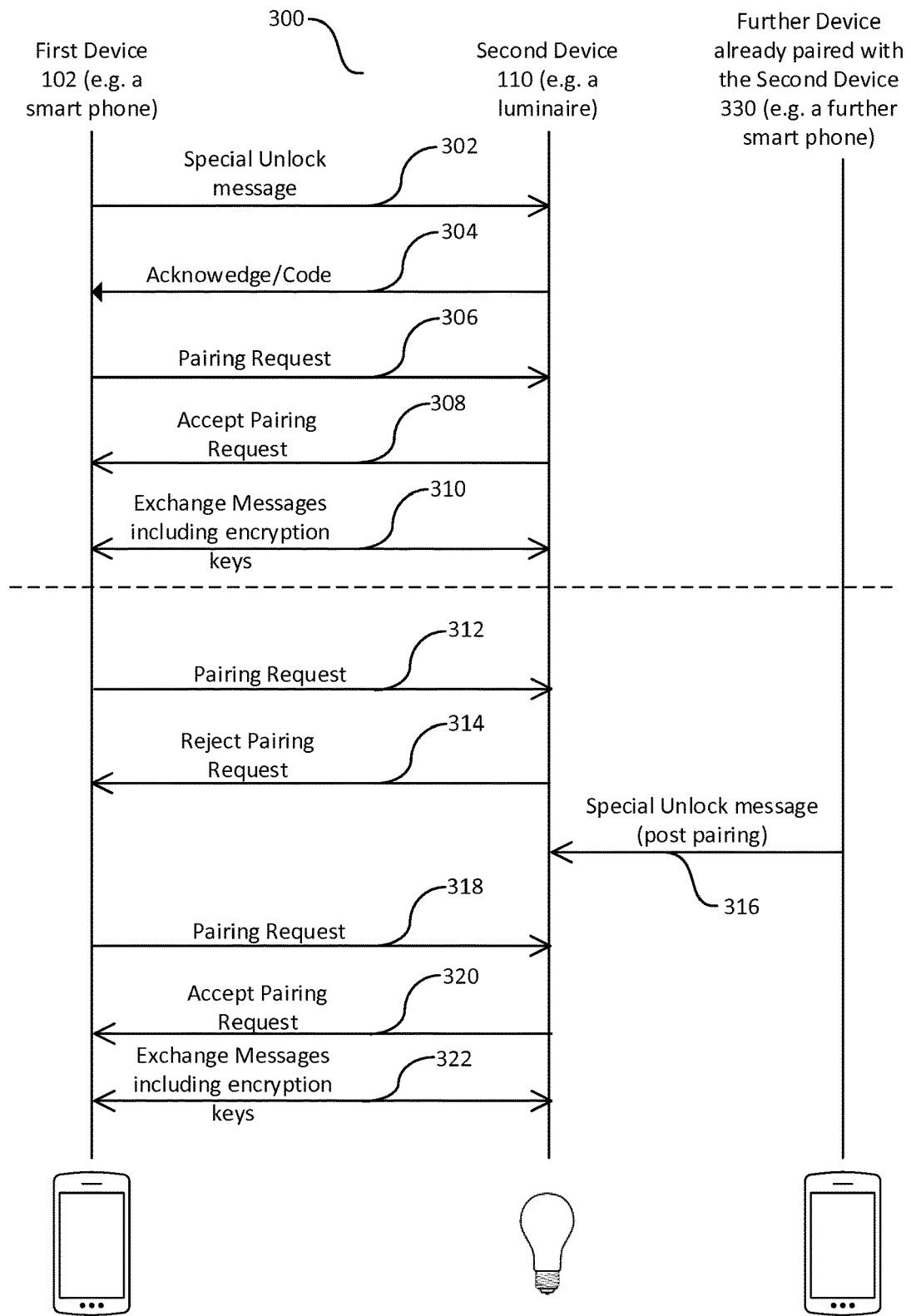
FIG. 3 is a schematic signaling chart showing a chained pairing process.

FIG. 3 shows the message exchange process 300 between the first device and the second device, and a further third device. The first device may be device 102 of FIG. 1, and could be for example a smart phone. The second device may be device 110 of FIG. 1, and could be for example a luminaire. The further device 330 is a second instance of a device similar to the first device 102 in function. In keeping with a first embodiment the (non-standardized) process using the non-standardized locking mechanism is carried out between the first and second devices. This begins with the first device 102 sending a special unlock message 302 to the second device 110. The message 302 includes at least some information such that subsequently the standardized pairing protocol is seen to have been 'unlocked'. The second device may respond to having received this special unlock message 302, and the successful completion of the (non-standardized) process, by sending an acknowledgment message 304 back to the second device 110. This return message 304 may include a code 126 for use in the subsequent standardized pairing protocol as proof of authentication. Subsequently the first device 102 attempts to pair with the second device 110 using the standardized pairing protocol. This standardized pairing is initiated by the sending of a pairing request message 306. As the (non-standardized) process has been successfully completed the second device 110 accepts the pairing request 308. The pairing message exchange then continues such that the pairing between the first and second is achieved. The message exchange may be complicated, but at least include the exchange of encryption keys 310.

If the first device wishes to pair with the second device 110, but has not completed the (non-standardized) process using the non-standardized locking mechanism, sending a special unlock message to the second device 110 prior to sending the pairing request 312, the pairing request 312 will be rejected 314 by the second device.

For example in a first embodiment, a connection between a smart phone and a wireless connected lamp is to be set up. It is intended to use Bluetooth Low Energy (BLE) for this connection. However, there may be some situation that inhibits the direct set up of this BLE connection, such as the physical situation where the bulb or lamp has already been placed in a luminaire on the ceiling. Such a limitation may make the standard BLE pairing method inconvenient to the user as the authentication code or passkey printed on the bulb is not easily accessible. A proximity based BLE method might be adequate in this situation, but a lighting device programmed for this type of control pairing protocol may not be highly desired as it is not a very secure one. Similarly the standardized 'JustWorks' pairing method alone is not a very secure one. Thus a (non-standardized) locking mechanism can be used to authorize the use of a standardized pairing method to the convenience of the user.

A special 'unlock' message is transmitted from the phone to the lamp. Using this special message the lamp then unlocks the JustWorks pairing method for use by that particular phone in paring with the lamp. A request to pair with the lamp from a phone that has not provided the special unlock message prior to the pairing request will not have its request accepted, and the phone will not be allowed to pair by the JustWorks method. That is to say any other phone at any other time, attempting to pair with the lamp without first providing the extra information included in the special unlock message (or further information received as a result of having previously provided the special unlock message, e.g. code 126) will have its request to pair rejected. As such a (non-standardized) locking mechanism is put in place to provide a level of authentication which is otherwise missing from the standardized pairing method JustWorks. Because the (non-standardized) locking mechanism has been successfully completed, the mobile device 102 is then allowed to use this less secure, standardized pairing protocol and encryption to connect.

The Philips app can provide this (non-standardized) locking mechanism. Thus any other applications on the device would be able to use the standard encryption methods to connect to the luminaire and control the lamp, the key having been obtained by the 'Just Works' pairing protocol.

In a second embodiment a method of pairing includes a further control device. In this embodiment the further mobile device (e.g. a smart phone), is already paired with the device to be controlled (e.g. a lamp). Such a scenario may occur for example when the user might change his phone (requiring lamps to be paired to a new phone). In this case it is the already paired phone that fulfils the requirement of sending the special unlock message. That is to say at a later time, having already paired with the device to be controlled, it is possible for the further already paired phone to authenticate the first device. The further mobile device being able to send the special unlock message to the lamp, for example by pressing a virtual button, to add subsequent control devices (here the first device). As such the already paired device 'vouches for' the second control device. The further mobile device may be in close proximity when it sends the special unlock message (i.e. using a proximity based authentication). It may be that the first device is also required to fulfil a proximity based authentication instead of using the (non-standardized) locking mechanism which has been completed instead by the further mobile device. The second device is then able to paring with the first device using the standardized pairing method. Alternatively or additionally the second control device may be explicitly identified to the lamp by the already paired further device, for example as part of the (non-standardized) locking mechanism.

In keeping with the second embodiment the (non-standardized) locking mechanism is carried out between the first device 102 and second device 110. The further device 330 is already paired with the second device 110, and the device wanting to pair with the second device 110 is again the first device 102. The further device 330 completes the (non-standardized) locking mechanism in place of the first device 102, and in this way the further device 330 vouches for the first device 102. Once the further device 330 has successfully sent the special unlock message (post pairing) 316, the first device 102 is able to request pairing with the second device 110. This standardized pairing may be carried out in such a way that the first device 102 must be in close proximity with the second device 110 in order to successfully pair with it. This is one way the second device 110 can be sure to connect to the correct device. Alternatively some information identifying the first device 102 may be exchanged with the second device 110 so that it is able to determine which device (102) has been authenticated by the actions of the further device 330 by proxy. Thus the first device is able to send a pair request message 318 to the second device 110 and have the request accepted 320, and proceed to pair with the second device 110 and exchange encryption keys 322.

Figure 4:
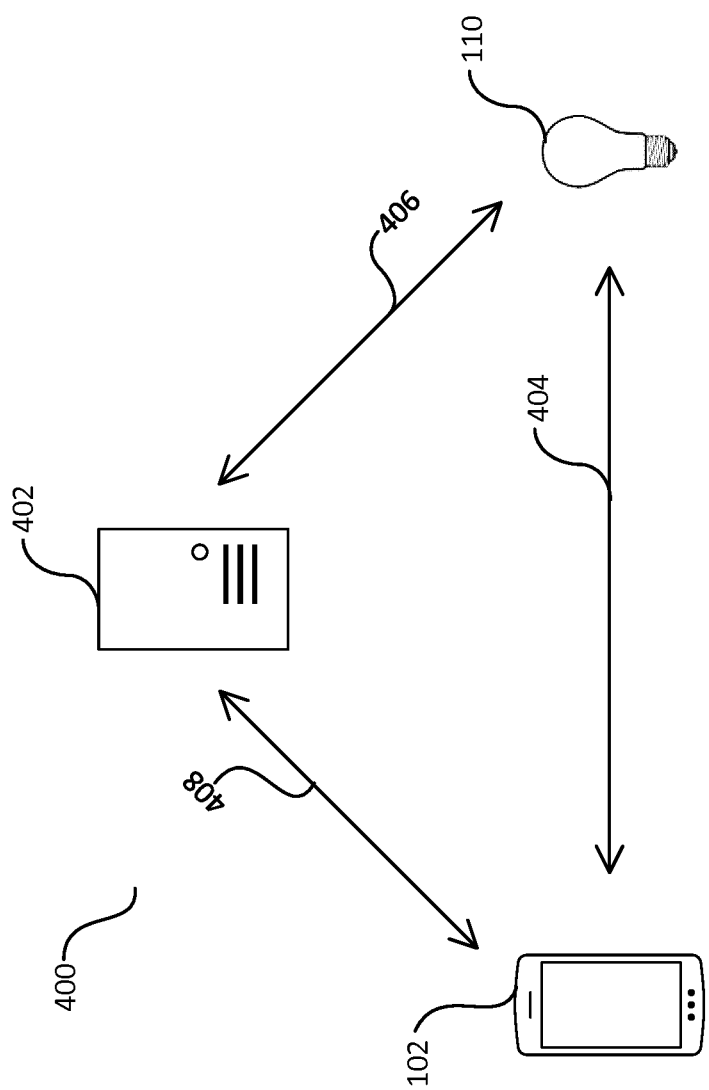
FIG. 4 is a schematic showing the message exchange process.

FIG. 4 shows the message exchange process 400 between the first device 102, a second device 110, and a back-end server 402 accessible via a portal. In a third embodiment the (non-standardized) locking mechanism also includes a back-end server 402, as well as a control device 102 such as a smart phone and a second device 110 (e.g. a lamp). In this third embodiment of the presently discussed pairing method, a new account with a new user ID may be created by a user. The new account is subsequently registered and is thus associated with a name, address etc. The new account is recognized as belonging to a known user. When the known user then logs in to the portal 402 a complex exchange of messages allows for the (non-standardized) locking mechanism to be unlocked. This is because it is possible to determine that the new account belongs to the same known user. The portal 402 carries out a secret exchange with the lamp 110. In the manner of a shared secret the lamp 110 and the portal 406 exchange half of a shared secret 406, and the portal 402 and the mobile device 102 exchange a secret number 408. The exchanges are done in a complex way that makes it difficult for a snooping third party to determine which parts of the exchanges are part of the secret. The shared secret enables derivation of a key by combining halves of the shared secret, where neither half alone gives away the key nor does it provide simply one half of the final key. Thus through a complex handshake the mobile device and lamp can communication such that the result is the authentication of the mobile device.

It should be acknowledged that although the arrows of FIGS. 3 and 4 indicate a single message or communication instance, there may in reality be a series of messages sent to communication the content represented by a single arrow. The single arrows merely serve to illustrate a general overview of the messaging processes.

In a fourth embodiment, similar to the paring method of the first embodiment, the (non-standardized) locking mechanism and standardized paring protocol are executed between a control device 102 such as a smart phone and a second device 110 such as a lamp. When the user has bought the lamp, unpacks it, and screws it in, it works in a factory new like mode. The unused lamp 110 reports it has no display. According to the BLE standard, pairing with a mobile phone 102 results in JustWorks pairing. The user does not need to enter a pin code. However, when the pairing has succeeded (or when e.g. 10 minutes have passed) the lamp "changes its mind" and reports it does have a display.

The mobile phone will send a pairing request message to the lamp. Typically this leads to an exchange where the lamp and the control device exchange messages detailing their capabilities, eventually settling on a pairing method that suits both devices based on these reported capabilities. For example if the lamp reports that it has a screen the two devices may settle on the pairing method of 'PassKey', as the lamp would thus be capable of displaying a key to the user. A factory new lamp can be pre-configured to report certain specific capabilities when a pairing request is received for the first time. As such the first pairing request may always be met with a report from the lamp that it does not have a display. Resulting in forcing the pairing method settled on to be that of the 'JustWorks' method. The lamp can then be further programmed to always report that it does have a display thereafter, and/or after a time-out period of e.g. 10 minutes has elapsed after activation. Where activation can be considered to be when the lamp is first powered-on (supplied with some power) or screwed into a fitting.

Subsequent pairing negotiations with other devices result in PassKey pairing needing to be used (negotiated by the devices involved), and the user having to enter the 6 digit code printed on the lamp. This approach ensures the lamp is easy to setup, but cannot be controlled by a neighbor. The lamp is vulnerable for a short time during setup, but not during years of use. This is because it is unlikely that a third/malicious party would discover the newly powered up device within the pre-defined window. However, the user of the second device (the lamp) would know the window is open as they are the party who plugged it in and opened the window. Over years of use the device is not vulnerable in this way as subsequent pairings are forced to use PassKey pairing, or some other second standardized pairing protocol.

In this embodiment it can be considered that the (non-standardized) locking mechanism is the extra coding in place which allows for and triggers the change in display state of the second device. That is the (non-standardized) locking mechanism is the coding which either determines a first pairing has been performed, and/or that determines whether a timeout period has elapsed. As such it can be seen that the (non-standardized) locking mechanism in all embodiments provides a layer on top of the standardized pairing protocol and yet distinctly separate therefrom. In this particular embodiment that layer results in a locking function, and subsequently the standardized 'JustWorks' pairing method is locked. This is because all subsequently received pairing requests will be refused via 'JustWorks' (as the lamp will report that a 'display is present') and 'PassKey' will be enabled. Further to this embodiment it may then be possible to re-activate or unlock the 'JustWorks' pairing method using one of the previously discussed 'unlocking' methods. As it is easier for the user, also at a later time, to pair without using a pass code, in a further instance of this embodiment, the lamp would again report that is does not have a display, forcing JustWorks to be used. This can be activated by: e.g. the mobile phone being very close to the lamp (based on signal strength measurement), a ZigBee command being sent to the lamp via a bridge (assuming the user has expanded his system with a bridge) initiating this mode, using coded light, etc.

Figure 5:
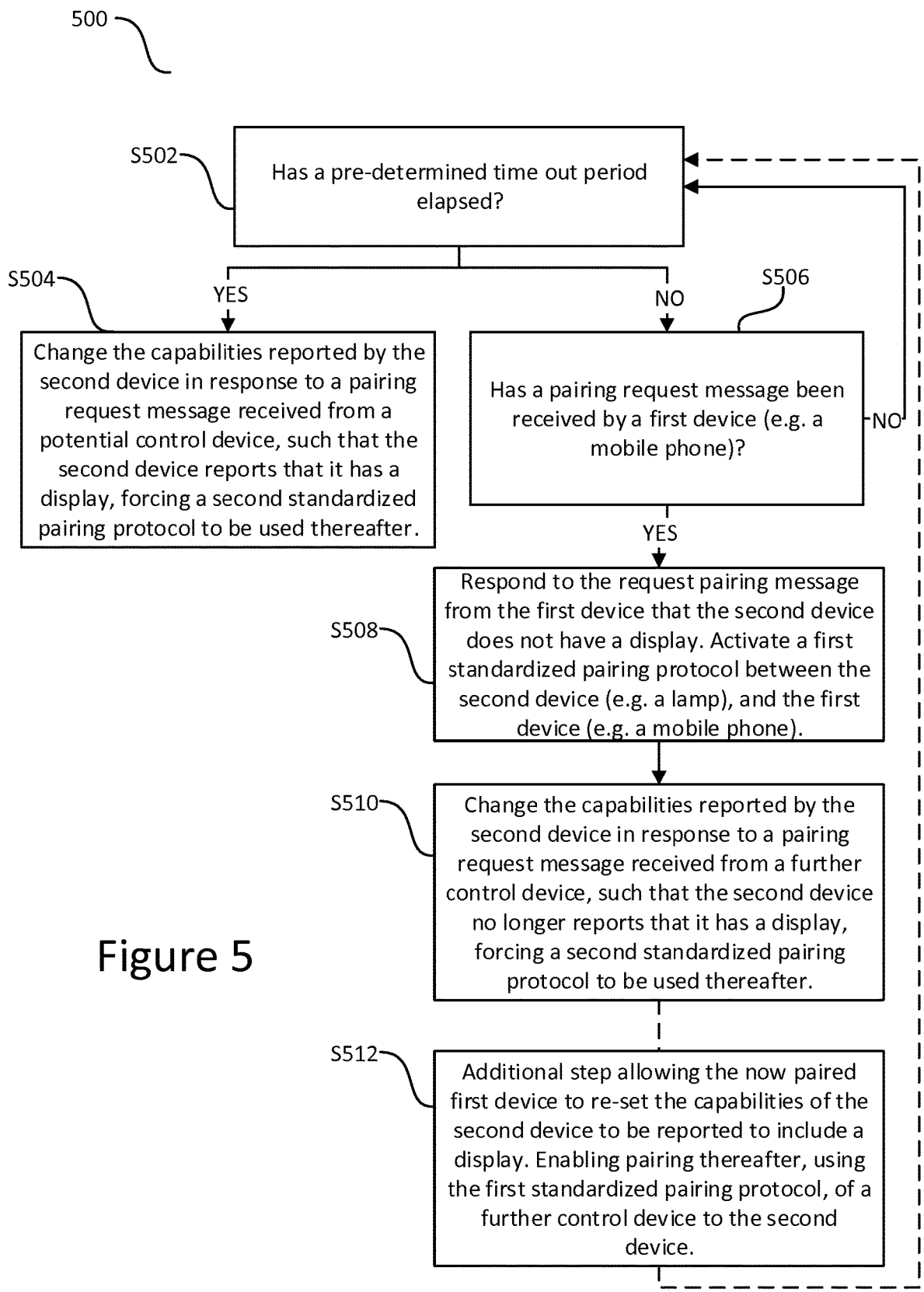
FIG. 5 is a schematic showing a flow chart for a process of using a layer of coding as the proprietary locking protocol.

FIG. 5 is a flow chart for process 500 of using a layer of coding as the (non-standardized) locking protocol, which changes the standardized pairing protocol thereafter.

The process starts at step S502 where the layer added onto the server includes a pre-determined window of time. This pre-determined window of time begins when the second device (e.g. the lamp), is first powered-on. That is the first time the device is provided with power and is considered to be 'switched on'. This may or may not involve a switch. Being supplied with power, the code providing the additional layer on top of the standardized pairing protocol is able to run. The window is set to end at some per-determined time thereafter, for example a 10 minute time period may be defined. This time period therefore provides a timing mechanism (which triggers the switching from a mode where the second device reports that it does not have a display, to a mode where the second device reports that it does have a display), in response to the elapsing of the pre-determined window of time. Within this window, which defines a time-out period, the second device (e.g. the lamp) reports that it does not have a display as part of the negotiations carried out in response to a pair request message. As a result the agreed upon standardized pairing protocol is a protocol that does not require a key or pin, such as the JustWorks pairing protocol.

If the pre-determined time out period has elapsed, the process proceeds to step S504. At this step the capabilities reported by the second device in response to a pairing request message received from a potential control device is different. The change is such that the second device no longer reports that it has a display. This forces a second standardized pairing protocol to be used. This second standardized pairing protocol is a protocol that requires the entry of a key or pin by the first device. For example PassKey pairing.

If the pre-determined time out period has not elapsed the process proceeds to step S506. Where the process determines whether a pairing request has been received by a first device. The first device can be any device capable of being a control device, e.g. a mobile phone, a tablet, etc.

If a pairing request message has been received, the process proceeds to step S508, where a first pairing protocol, different to the second pairing protocol described at step S504, is activated. This first pairing protocol is a protocol which does not require a display in order to be carried out, for example the JustWorks pairing protocol. Thus in response to the pairing request message received from the first device, the second device reports that it does not have a display.

The process then proceeds to step S510. After a first pairing has been carried out the second device then switches the capabilities it reports in response to a pairing request message, such that it now repot that it does have a display. As a result the standardized pairing protocol settled on during the pairing negotiations between the second device and any further mobile devices wishing to pair is a second standardized pairing protocol. For example the second standardized pairing protocol may be that of PassKey pairing, instead of the previously used JustWorks pairing protocol.

There may be an additional step to the process, where at some time after the first device has paired with the second device, the first device sends a message to the second device that causes the second device to no longer report that it has a display. This activates the first standardized pairing protocol again, i.e. JustWorks. Therefore a further control device is then allowed to pair with the second device using the first standardized pairing protocol, and without requiring a key or code. As such the first device provides an authentication by proxy for the further device in a similar way to the above discussed second embodiment. The process can be thought of as having been reset back to step S502 as a result of this step S512.

Additional step S512 may allow the now paired first device to re-set the capabilities of the second device at a later date, such that it again reports that it includes a display. Thus enabling pairing thereafter, using the first standardized pairing protocol, of a further control device to the second device.

This can include the exchanging of IDs of the devices involved, and additionally may include the authentication of one device to the other, or each device to the other respective device. The exchanged information in message 304 may include a code 126 that allows for the mobile phone to authenticate itself. For example part of the standardized pairing protocol may require the entry of the code 126 at the user interface of the first device.

A further example is a Hue lamp that supports both Bluetooth and ZigBee communication. Consider using ZigBee to setup Bluetooth pairing. While from the perspective of Bluetooth, exchanging information via ZigBee could be implemented as standard-out-of-band method, Android and iOS don't support this. However, using ZigBee information can be exchanged. Perhaps resulting in showing a 6 digit key on the mobile phone. This can be the key used to setup a standard Bluetooth passkey pairing. Alternatively, ZigBee proximity based pairing could be used to unlock BLE "Just Works" pairing (which means that the user does not need to look for a pass key). When the phone has paired (and bonded) with the device it can communicate via Bluetooth in the standard way, using standard encryption.

In this embodiment, with reference to FIG. 1, the device 110 is again a luminaire (i.e. a Hue lamp). In this example the luminaire 110, and device 102, are able to support both Bluetooth and ZigBee communication. Thus alternative interface 120 is a transceiver capable of communicating using the ZigBee protocol, and transceiver 112 supports Bluetooth connections. The alternate interface 108 thus also supports communication using the ZigBee protocol. Therefore in this embodiment ZigBee is used to unlock Bluetooth pairing. The (non-standardized) locking mechanism uses ZigBee, and transmits a 6 digit key to the mobile phone. Android and iOS do not support out-of-band communications in standard Bluetooth pairing. However, where standard-out-of-band pairing is supported the exchange of information via ZigBee can unlock the BLE connection in this way. Where out-of-band isn't supported ZigBee can still be used to exchange information by acting as the (non-standardized) locking mechanism. For example by the ZigBee transmission 124 comprising the special unlock message, and possibly also code 126. The code 126 can be a 6 digit key for display on the mobile phone, and could be used in the standard Bluetooth passkey pairing. The ZigBee protocol also comprises a proximity pairing capability. As such the ZigBee proximity pairing via transmission 124 could be used to unlock the pairing protocol of BLE 'Just Works'. An advantage of this latter example is a user would therefore not be required to look for a passkey should their device not support the out-of-band Bluetooth pairing. It should be understood that proximity pairing, whether through the ZigBee protocol or otherwise, is not part of the BLE standardized paring protocol, and thus still provides the (non-standardized) locking mechanism. Thus although part of the ZigBee standardized pairing protocol, proximity pairing in this embodiment provides a (non-standardized) locking mechanism layer that is not considered as part of the standardized protocol subsequently used.

In reference to FIG. 1, the (non-standardized) locking mechanism may include the entering of a printed code found on the box of the lamp or luminaire, reading a QR code, or detecting a code in coded light emitted from the bulb, using alternative interface 108. The benefit to using these methods is that there is an intrinsic proximity related to retrieving a code in these manners. In doing so there is a layer of security added onto the standardized pairing protocol used thereafter. That is to say there is a significantly higher likelihood that the person able to access codes presented in these manners, and other ways not explicitly stated but that would be obvious to the skilled person, is the owner and intended user of the lamp. The code 126 may be a hexadecimal code, and as such would not conform with the BLE standard out-of-band methods which only allows for the entering of 6 decimal digits. The (non-standardized) locking mechanism may also rely directly on proximity. As such a proximity small enough to ensure the correct mobile device is being used (by the correct intended user) would be desired. But not a proximity so far that the distance from the device to the ceiling (and luminaire) is too great.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for establishing a wireless communication connection for exchanging of control messages between a first device and a second device using both of a locking mechanism and a pairing protocol, the method comprising:
    applying the non-standardized locking mechanism to set between the first device and second device whether access to the first pairing protocol is locked or unlocked; and
    on condition of being activated by said locking mechanism, performing a pairing between the first device and the second device using the first pairing protocol,
    upon completion of the pairing protocol activating the wireless communication connection for exchanging of control messages; and further switching the second device from a state in which the second device reports that it does not have a display to a mode in which the second device reports that it does have a display, thereby triggering a switching of mode wherein the second device switches from a mode which requires the first device to use the first pairing protocol to a mode which requires the first device to use a second pairing protocol.

2. The method of claim 1, wherein responsive to activation by the locking mechanism, the first device obtains authentication for the pairing, and the completion of the pairing is conditional on said authentication.

3. The method of claim 1, wherein the locking mechanism is performed between a third device having already paired with the second device, and the second device, and said pairing protocol is activated between the first device and the second device on condition of the locking mechanism being performed by the third device.

4. The method of claim 1, wherein the locking mechanism requires an unobstructed line of sight between the first device and second device.

5. The method of claim 1, wherein the locking mechanism requires the first and second devices to be within a pre-determined physical proximity.

6. The method of claim 1, wherein the second pairing protocol requires a user to manually enter a code of the second device into a user interface of the first device, whereas the first pairing protocol does not.

7. The method of claim 1, wherein said locking mechanism comprises a timer mechanism configured to trigger said switching of mode in response to the elapsing of a pre-determined window of time.

8. The method of claim 1, wherein the first pairing protocol is Bluetooth JustWorks pairing.

9. The method of claim 1, wherein the second pairing protocol is Bluetooth PassKey pairing.

10. The method of claim 1, wherein the locking mechanism is determining if a new user account belongs to a known user by comparing account registration information.

11. The method of claim 10, wherein the locking mechanism is completed using a shared secret between the first device and a server, and the second device and said server.

12. A device to be controlled, being operable to establish a wireless communication connection with another, controlling device for exchanging of control messages using both of a locking mechanism and a pairing protocol, the controlled device comprising:
    a control logic for applying the locking mechanism to set whether access to the pairing protocol is locked or unlocked; and
    a transmitter and receiver configured to: perform a pairing between the controlled device and the controlling device using the first pairing protocol, on condition of being activated by said locking mechanism, wherein upon completion of the pairing protocol activating the wireless communication connection for receiving of control messages; and further switching the controlled device from a state in which the controlled device reports that it does not have a display to a mode in which the controlled device reports that it does have a display, thereby triggering a switching of mode wherein the controlled device switches from a mode which requires the controlling device to use a first pairing protocol to a mode which requires the controlling device to use a second pairing protocol.

13. A non-transitory computer program product comprising code embodied on computer-readable storage and configured so as when run on one or more processing units of a controlled device to establish a wireless communication connection with another, controlling device for exchanging of control messages using both of a locking mechanism and a pairing protocol, the computer program product being configured to perform operations of:
    applying the locking mechanism to set whether access to the pairing protocol is locked or unlocked; and
    performing a pairing between the controlled device and the controlling device using the first pairing protocol, on condition of being activated by said locking mechanism, wherein upon completion of the standardized pairing protocol activating the wireless communication connection for receiving of control messages; and further switching the controlled device from a state in which the controlled device reports that it does not have a display to a mode in which the controlled device reports that it does have a display, thereby triggering a switching of mode wherein the controlled device switches from a mode which requires the controlling device to use a first pairing protocol to a mode which requires the controlling device to use a second pairing protocol.

* * * * *